Oct. 26, 1954     J. DECHENTREITER     2,692,465
DRIVING MECHANISM FOR COMBINES
Filed May 4, 1951     2 Sheets-Sheet 1
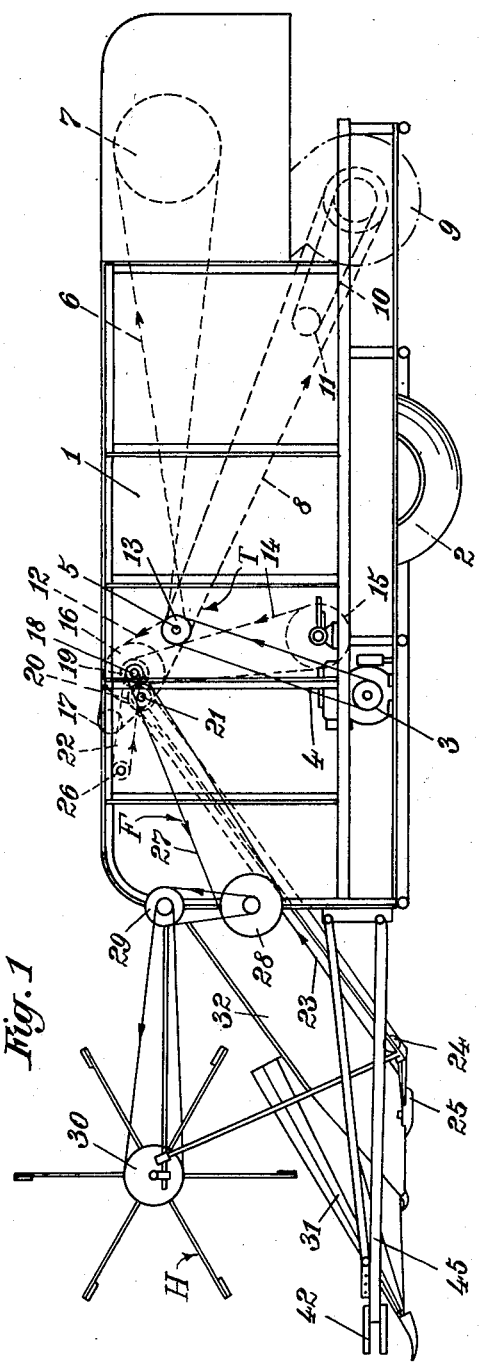
Inventor:
J. Dechentreiter
By   Attorneys Oct. 26, 1954  J. DECHENTREITER  2,692,465
DRIVING MECHANISM FOR COMBINES
Filed May 4, 1951  2 Sheets-Sheet 2
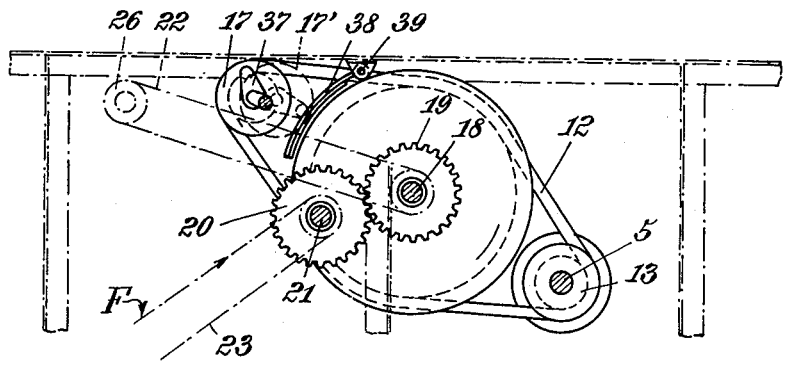
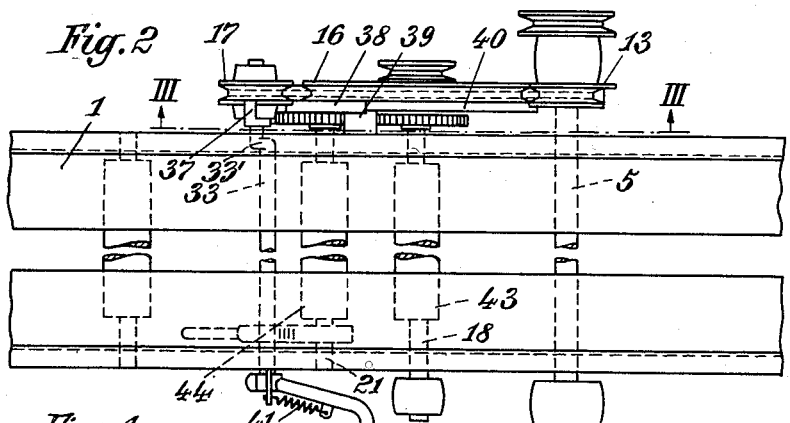
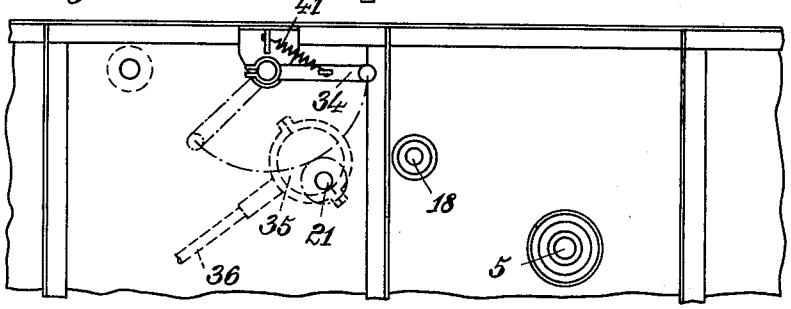
Inventor:
J. Dechentreiter
By Attorneys Patented Oct. 26, 1954

2,692,465

UNITED STATES PATENT OFFICE 2,692,465

DRIVING MECHANISM FOR COMBINES

Josef Dechentreiter, Baumenheim, near Donauworth, Germany

Application May 4, 1951, Serial No. 224,468

Claims priority, application Germany January 13, 1951

2 Claims. (Cl. 56—20)

In the harvesting of cereals combined mowing and threshing machines in which the cereals are mowed, threshed and the threshed out straw is bound into sheaves which are discharged, are nowadays more and more extensively used.

In such mowing and threshing machines it often happens that disturbances occur during the mowing either because a foreign body enters into the teeth of the mowing beam or because of the unevenness of the ground, a large stone or the like may be encountered on the way or when turning. In all these cases and also when turning the combined mower and threshing machine has to be stopped. However, the threshing drum, the elevator, the press, etc. have a considerable rotative moment or great inertia which prevents an immediate stoppage. On the other hand, a substantial motor power is required to restart the operation of these parts since the large masses have first of all to be accelerated before restarting the operation.

The object of the invention is to overcome these difficulties and to produce a combined mowing and threshing machine the mowing parts of which can be quickly rendered inoperative without there being a large power loss when restarting.

According to the invention, in the case of a combined mowing and threshing machine in which the drive of the individual parts is effected from a common shaft, for instance from the shaft of a threshing drum, which in its turn is driven by a motor, the drive of the individual aggregates is divided into two groups of which one, namely that lying in the feeding direction of the cereals before the threshing drum, can be disconnected by means of a coupling from the latter and from the group lying beyond it. If an unexpected obstacle is encountered by this machine, only those parts are disconnected from the general drive which are directly affected by the obstacle, more particularly the mowing devices, whilst those parts which have great inertia, more particularly the threshing drum and the individual aggregates of the threshing machine lying behind the drum, continue to be driven. It will be clear that in this way the operation is very adaptable to the prevailing conditions, whilst the power consumption is at the same time reduced.

Preferably, the detachable coupling is inserted between the shaft of the threshing drum and a further shaft, for instance, the driving shaft for the driving cylinder of the upper conveying band, and comprises an adjustable tension roller by the adjustment of which the belt drive between the shaft of the threshing drum and the band cylinder is either tensioned or loosened, thereby providing a soft coupling and uncoupling.

According to a further feature of the invention the tension roller is so disposed that when it is loosened a brake becomes effective, whereby the running band cylinder at the running off end and thus also the following on parts drivingly connected therewith are quickly brought to a standstill.

One example of construction according to the invention is illustrated in the accompanying drawings, in which:

Figure 1 is a side view of a combined mowing and threshing machine according to the invention, Figure 2 is a plan view of the coupling arrangement between the shaft of the threshing drum and the shaft of the band cylinder on an enlarged scale.

Figure 3 is a section along the line III—III of Figure 2, and

Figure 4 is a side view of the adjusting device.

1 is the framework of a mowing and threshing machine according to the invention, supported in the usual way on only two wheels, of which one wheel 2 is seen in Figure 1. As shown in Figure 1, a header mechanism H, a feeder mechanism F and a thresher mechanism T are carried by the framework 1. The source of power for the individual aggregates of the machine is a motor 3 which drives the shaft 5 of the threshing drum by means of a belt 4. The shaft 5 drives a straw press 7 by a belt 6, an elevator 9 by a belt 8 and from the elevator a scattering blower 11 is operated by a belt 10. The individual aggregates referred to are in constant operative connection with the motor 3.

The shaft 5 of the threshing drum also drives by a V-belt 12, those parts which are to be disconnected with any obstacles or the like are encountered. The belt 12 runs from a disc 13 mounted on the shaft 5 of the threshing drum and whch may have a comparatively small diameter, over a disc 16 of very large diameter to the tension roller 17, which again may have a small diameter. The diameter of the disc 16 is larger since only a comparatively small part of its periphery is in engagement with the belt 12 whilst the discs 13 and 17 are surrounded approximately 180° by the belt. The disc 16 is mounted on the shaft 18 of the upper band cylinder. The shaft 18 is in positive engagement with the shaft 21 of the lower band cylinder by the toothed wheels 19, 20 which constitute a drive connection. The two shafts 18 and 21 drive the conveying bands or feeder mechanism 22 and 23. The conveying band 23 runs over a loose feeding roller 24, running therewith, in the proximity of the mowing beam 25, whilst the conveying band 22 is led over a loose roller 26 in the proximity of the band rollers. The upper shaft 18 drives by a belt 27 and a reducing gear 28, 29 a windlass 30, which throws the cut cereals on to the conveying band 23, thereby assisting the transport. Guiding surfaces 31, 32 provide crop dividing means as is known in the art. 45 is a system of rod engageable at 42 to a tractor (not shown), which pulls the mowing and threshing machine. The rod 36 of the mowing beam is driven from the shaft of the lower drum 21 by an eccentric 35, the longitudinal to and fro movement of which rod is transmitted through an articulated lever (not shown) to the knife (not shown) of the mowing beam 25 and constitutes a drive connection to the header mechanism. The details of this drive need not be described. 15 is a straw discharger which is driven from the shaft 18 of the upper band by means of a belt 14.

The cereals which have been gripped by the guiding surfaces 31, 32 and cut by the mowing beam 25 are thrown by the windlass 30 on to the conveying band 23, they are moved upwards and led to the threshing drum (not shown) between the bands 23 and 22 and the two band cylinders 43, 44, and dealt with in a manner known per se.

The tension roller 17 constituting a clutch means is mounted eccentrically on the crank end 33' of a shaft 33, which is mounted in the casing 1 of the combined mower and thresher and at its other end, the shaft 33 is provided with a handle 34. When the handle 34 is turned from the right top end to the left lower end, as can be seen in Figure 4, the tension roller 17 comes into the position 17' shown in dot and dash lines in Figure 3. In this condition the tension of the belt 12 is released and no transmission of power takes place between the shaft 5 and the shaft 18. The conveying bands 22, 23, the straw discharger 15, the mowing beam 25 and the windlass 30 are disconnected.

When the lever 34 is operated, a cam 37 mounted on the shaft 33 is also turned, the same abutting against the brake jaw 38 which is pivoted at 39 and presses the brake 38 against the rim 40 of the disc 16. In this way, as the tension of the belt 12 is released, the disc 16 and therewith all the individual aggregates driven through the shaft 18 are at once stopped. When the lever 34 is returned to its position, first of all the brake 38 is released, whereupon the belt 12 is again tensioned so that the disconnected individual aggregates can again be quickly brought into operation. Since, as a rule, the operative parts lying before the threshing drum have to be disconnected for a short period of time the lever 34 is provided with a return spring 41 so that when set free the connecting up can take place automatically.

It will be seen that in this way the mowing process can be interrupted for a short period of time with a minimum of expenditure without the large rotating masses of the threshing drum, straw press, elevator and scattering blower having to be disconnected.

I claim:

1. A combined harvester and thresher machine having a frame, a header mechanism, a feeder mechanism and a thresher mechanism carried by the frame, a power driven shaft journalled in the frame for driving the thresher mechaism, a second shaft rotatably mounted in the frame, a pulley on each of the shafts, a belt trained around said pulleys, drive connections between said pulley on the second shaft and the feeder and header mechanisms and clutch means for coupling said header mechanism simultaneously with the feeder mechanism independently of the thresher mechanism, said clutch means including a tension roller, a shaft for the tension roller journalled in the frame, crank means on the tension roller shaft for mounting the roller, further means carried by the tension roller shaft to turn the shaft toward or away from the pulley on the second named shaft, a brake jaw pivoted to the frame for movement toward and away from the pulley on the second named shaft, cam means on the tension roller shaft adapted to bear against the brake jaw and urge said jaw into engagement with the periphery of the pulley on the second named shaft when the tension roller shaft is turned to move the roller toward said pulley on the second named shaft thereby arresting the drive from the driven shaft to the header and feeder mechanisms.

2. A machine as defined in and claimed by claim 1 further characterized in that the diameter of the pulley on the second shaft is materially greater than that of the tension roller, the diameter of the tension roller being such that the belt extends about 180 degrees around the periphery of the tension roller.

References Cited in the file of this patent

UNITED STATES PATENTS

| Number | Name | Date |
| --- | --- | --- |
| 1,791,714 | Conley | Feb. 10, 1931 |
| 1,820,570 | Krause | Aug. 25, 1931 |
| 2,208,278 | Orr | July 16, 1940 |